United States Patent
Kulprathipanja et al.

(10) Patent No.: US 10,494,304 B2
(45) Date of Patent: *Dec. 3, 2019

(54) HIGH TEMPERATURE CALCIUM SILICATE INSULATION

(71) Applicant: JOHNS MANVILLE, Denver, CO (US)

(72) Inventors: Ames Kulprathipanja, Broomfield, CO (US); Rick Lee Dolin, Fruita, CO (US); Noel Camp, Grand Junction, CO (US)

(73) Assignee: Johns Manville, Denver, CO (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/602,850

(22) Filed: May 23, 2017

(65) Prior Publication Data

US 2017/0260097 A1     Sep. 14, 2017

Related U.S. Application Data

(63) Continuation of application No. 14/688,304, filed on Apr. 16, 2015, now Pat. No. 9,670,098.

(51) Int. Cl.
*C04B 28/18* (2006.01)
*C04B 111/28* (2006.01)

(52) U.S. Cl.
CPC ......... *C04B 28/188* (2013.01); *C04B 2111/28* (2013.01)

(58) Field of Classification Search
CPC .................. C04B 28/188; C04B 2111/28
See application file for complete search history.

(56) References Cited

U.S. PATENT DOCUMENTS

| | | |
|---|---|---|
| 3,001,882 A | 9/1961 | Taylor |
| 4,128,434 A | 12/1978 | Pusch |
| 4,144,121 A | 3/1979 | Otouma et al. |
| 4,334,931 A * | 6/1982 | Asaumi ............... C04B 28/188 106/712 |
| 4,447,380 A | 5/1984 | Shannon et al. |
| 4,681,809 A | 7/1987 | Kitano et al. |
| 4,690,867 A | 9/1987 | Yamamoto et al. |
| 5,073,199 A | 12/1991 | Krowl et al. |
| 6,692,678 B2 | 2/2004 | Krowl et al. |
| 9,670,098 B2 * | 6/2017 | Kulprathipanja ..... C04B 28/188 |
| 2011/0108514 A1 | 5/2011 | Del-Gallo et al. |

FOREIGN PATENT DOCUMENTS

| | | |
|---|---|---|
| EP | 0 763 392 B1 | 6/2002 |
| JP | 2003 104769 A | 4/2003 |
| WO | 2011/085723 A1 | 7/2011 |
| WO | 2013/154070 A1 | 10/2013 |

OTHER PUBLICATIONS

Marinite C, A and A(HP), Refractory Products, Inorganic board insulation to convey and form aluminum, BNZ Materials, Inc., Denver, Colorado, USA, Nov. 1997.
CS85, Marinite P and Transite HT, Refractory Products, Structural High Temperature Insulations for Foundries, BNZ Materials, Inc., Denver, Colorado, USA, Dec. 1998.
Data Sheet for Marinite CF, Aug. 1, 2012, BNZ Materials, Inc., North Billerica, MA, USA.

* cited by examiner

*Primary Examiner* — C Melissa Koslow
(74) *Attorney, Agent, or Firm* — Robert D. Touslee

(57) ABSTRACT

A calcium silicate insulation product includes a calcium silicate hydrate matrix that is predominantly but not substantially all xonotlite, for example 51-90 weight percent xonotlite and 10-49 weight percent tobermorite. The insulation product also contains wollastonite, and may include fines of lime and silica and reinforcing carbon fibers. A method of producing the insulation product includes providing the components of the insulation as dry solids, blending the dry solids with water to form a slurry, filter pressing the slurry to form a pressed shape, and curing the pressed shape under steam pressure only until the desired proportions of xonotlite and tobermorite are achieved in the calcium silicate hydrate matrix.

20 Claims, No Drawings

HIGH TEMPERATURE CALCIUM SILICATE INSULATION

This application is a continuation of U.S. patent application Ser. No. 14/688,304 filed Apr. 16, 2015, now U.S. Pat. No. 9,670,098 issued Jun. 6, 2017, and titled "High Temperature Calcium Silicate Insulation", the entire disclosure of which is hereby incorporated by reference herein for all purposes.

BACKGROUND OF THE INVENTION

Calcium silicate insulation is often used in extreme temperature environments, due to its good insulating properties, durability, fire resistance, machinability, and inertness. For example, in the aluminum foundry industry, calcium silicate plates are often used as dies for the forming of aluminum ingots, as well as for creating troughs and the like for the channeling of molten aluminum. Thus, the insulation is in long term direct contact with the molten aluminum.

Such harsh conditions, and especially temperature fluctuations that occur under repeated use cycles of the insulation, can cause cracking or other failures of the components made of calcium silicate, necessitating their regular replacement. There is accordingly a need for even more durable calcium silicate insulation, for increased part life and decreased frequency of part replacement.

BRIEF SUMMARY OF THE INVENTION

According to one aspect, an insulating material comprises a calcium silicate hydrate matrix having 51-90 weight percent xonotlite and 10-49 weight percent tobermorite. The insulating material further comprises wollastonite, and the weight of wollastonite in the insulating material is 25-200 percent of the combined weights of the xonotlite and tobermorite. The insulating material is formed into a substantially uniform rigid body. In some embodiments, the calcium silicate hydrate matrix has 62-81 weight percent xonotlite and 19-38 weight percent tobermorite. In some embodiments, the calcium silicate hydrate matrix has 66-76 weight percent xonotlite and 24-34 weight percent tobermorite. In some embodiments, the insulating material further comprises carbon reinforcing fibers, and the insulating material has a flexural strength of at least 1300 lb/in$^2$. In some embodiments, the insulating material has a flexural strength of at least 1400 lb/in$^2$. In some embodiments, the insulating material has a flexural strength of at least 1500 lb/in$^2$. In some embodiments, the insulating material has a compressive strength of at least 2600 lb/in$^2$. In some embodiments, the insulating material has a compressive strength of at least 3200 lb/in$^2$. In some embodiments, the density of the insulating material is less than 55 lb/ft$^3$. In some embodiments, the insulating material has a linear shrinkage in length of less than 0.5 percent at 1380° F. In some embodiments, the insulating material has a linear shrinkage in length of less than 0.4 percent at 1380° F. In some embodiments, the insulating material has a linear shrinkage in thickness of less than 0.90 percent at 1380° F.

In some embodiments, the insulating material further comprises carbon fibers and fines of lime and silica, and the insulating material has a flexural strength of at least 1300 lb/in$^2$, a compressive strength of at least 2600 lb/in$^2$, and a density of less than 55 lb/ft$^3$. In some embodiments, the insulating material further comprises carbon fibers and fines of lime and silica, and the insulating material has a flexural strength of at least 1500 lb/in$^2$, a compressive strength of at least 3200 lb/in$^2$, and a density of less than 55 lb/ft$^3$. In some embodiments, the weight of wollastonite in the insulating material is 50-175 percent of the combined weights of the xonotlite and tobermorite. In some embodiments, the weight of wollastonite in the insulating material is 120-160 percent of the combined weights of the xonotlite and tobermorite.

According to another aspect, a method of making an insulating material comprises providing as dry solids 10-20 weight percent previously-prepared xonotlite, 15-25 weight percent lime, 15-25 weight percent silica, and 35-55 weight percent wollastonite. The method further comprises blending the dry solids with water to form a slurry, filter pressing the slurry to form a pressed shape; and curing the resulting pressed shape under steam pressure only until the resulting composition includes, in addition to the wollastonite and any residual lime and silica, a calcium silicate hydrate matrix having 51-90 weight percent xonotlite and 10-49 weight percent tobermorite. In some embodiments, the method comprises curing the resulting pressed shape under steam pressure only until the resulting composition includes, in addition to the wollastonite and any residual lime and silica, a calcium silicate hydrate matrix having 62-81 weight percent xonotlite and 19-38 weight percent tobermorite. In some embodiments, the method comprises curing the resulting pressed shape under steam pressure only until the resulting composition includes, in addition to the wollastonite and any residual lime and silica, a calcium silicate hydrate matrix having 66-76 weight percent xonotlite and 24-34 weight percent tobermorite. In some embodiments, curing the resulting pressed shape under steam pressure comprises curing the resulting pressed shape under saturated steam at 12-18 bar for 5 to 8 hours.

DETAILED DESCRIPTION OF THE INVENTION

The durability of calcium silicate insulation is related especially to the flexural and compressive strength of the insulation, as well as to the shrinkage and expansion of the insulation under changes in temperature. More shrinkage and expansion tends to promote cracking, splintering, and eventual degradation of the insulation, and thus, lower shrinkage is desirable. In addition, higher mechanical strength promotes durability, and a material with a higher mechanical strength tends to resist cracking and splintering better than a material with a lower mechanical strength.

The properties of the material are in turn determined by the particular proportions of the constituents combined to make the material, and the processing used in making the final material from the constituents.

Calcium silicate insulation according to embodiments of the invention includes combinations of different calcium-silicate compounds and crystalline structures, for example xonotlite, tobermorite, and wollastonite. In particular, xonotlite and tobermorite are calcium silicate hydrates having different crystalline structures, and their combination is sometimes referred to as a calcium silicate hydrate matrix. Xonotlite is a monohydrate (6CaO.6SiO2.H2O), while tobermorite can be up to a penta-hydrate (5CaO.6SiO2.5H2O). By contrast, wollastonite is non-hydrated, and may be considered an inert filler in the material composition.

In general, the shrinkage of an insulation material increases with the hydrate content, so any tobermorite contributes disproportionately to shrinkage as compared with an equal amount of xonotlite. In turn, wollastonite shrinks comparatively little as compared with xonotlite and especially as compared with tobermorite. However, the presence of significant amounts of tobermorite may contribute to the integrity and strength of the insulation material. The material strength and durability can be further improved by the addition of reinforcing fibers, for example carbon fibers.

Prior calcium silicate materials have tended to include a majority of tobermorite or substantially all xonotlite in the calcium silicate hydrate matrix. Embodiments of the invention combine xonotlite and tobermorite with wollastonite and other components to achieve improved performance in strength and shrinkage, and consequent improvements in the durability of the insulation material.

In particular, a calcium silicate insulation according to embodiments has a calcium silicate hydrate matrix that is predominantly (more than 50 weight percent) xonotlite, but is not substantially all xonotlite. That is, the calcium silicate hydrate matrix includes significant tobermorite as well, for example 10 weight percent or more. This relationship may also be expressed as the ratio of xonotlite to tobermorite by weight in the finished insulation product. For example, equal proportions of xonotlite and tobermorite in the calcium silicate hydrate matrix would result in a xonotlite:tobermorite weight ratio of 1:1 in the finished product. Similarly, a calcium silicate hydrate matrix having 70 weight percent xonotlite and 30 weight percent tobermorite results in a xonotlite:tobermorite weight ratio of 2.33 in the finished insulation product.

According to other embodiments, the proportion of xonotlite and tobermorite (the calcium silicate hydrate matrix) to the amount of wollastonite in the insulation may be specified. The presence of wollastonite in significant quantities may tend to limit the shrinkage of the insulation product, and therefore may also contribute to the durability of the insulation product. For example, the weight of wollastonite in the finished product may be 25-200 percent of the combined weights of xonotlite and tobermorite, and preferably 50-175 percent, and more preferably 120-160 percent. In some embodiments, wollastonite may make up 25-65 percent by weight of the mineral content of the finished product (excluding any reinforcing fibers), preferably 30-60 percent, and more preferably 40-50 percent.

Finally, the insulation product contains fines of lime and silica, which may be residual from the process of forming the insulation product as is described in more detail below. The fines may make up 1-20 weight percent of the mineral content of the finished product (excluding the reinforcing fibers), preferably 2-15 percent, and more preferably 5-12 percent.

While the mechanical strength of calcium silicate insulation typically increases with density, insulation products according to embodiments of the invention may achieve high mechanical strength without excessive density. For example, in one particular embodiment, the product has a flexural strength greater than 1500 lb/in$^2$ and a compressive strength greater than 3200 lb/in$^2$ (as measured according to ASTM test standards C203 and C165), but a density of less than 55 lb/ft$^3$.

Insulation products such as those described above may be produced by blending selected dry solids in selected proportions with water to form a slurry, filter pressing the slurry, and curing the resulting pressed shape.

In embodiments, the combined dry solids may include:
10-20 weight percent previously-prepared xonotlite, for example 15 weight percent;
15-25 weight percent lime, for example 19 weight percent;
15-25 weight percent silica, for example 19 weight percent;
35-55 weight percent wollastonite, for example 45 weight percent; and
1-5 weight percent carbon fibers, for example 2 weight percent.

The previously-prepared xonotlite may be supplied in slurry, powder, granular, or another suitable form. The lime and silica may be provided in any suitable form, but are preferably supplied as fine powder or "flour". Similarly, the wollastonite may be provided in any suitable form, such as a powder or granular form. These components are generally readily commercially available.

The carbon fibers may be, for example, Tenax®-A HT C124 fibers 6 mm long and having a diameter of 7 microns, available from Toho Tenax America, Inc. of Rockwood, Tenn., USA, or another suitable kind of fibers. For example, other suitable lengths and diameters of fibers may be used. The fibers may include a sizing to promote their dispersion in water.

The combined dry solids are then blended with water to form a slurry. Any suitable amount of water may be used, for example 4-6 pounds of water per pound of the combined dry solids. In one example embodiment, 4.5 pounds of water is used per pound of the dry solids. The blending preferably utilizes continuous high-shear mixing, but in some embodiments, other kinds of mixing may be used, for example intermittent mixing. The slurry is preferably maintained at a temperature that promotes its workability and filtration. In some embodiments, the slurry may be at about 95-135° F. for blending.

The slurry is then filter pressed to remove excess water, resulting in a pressed shape such as a slab, board, or other shape.

The resulting shape is then cured at elevated temperature and pressure, for example by autoclaving in saturated steam at a pressure of 12-18 bar, for example 15 bar. During the curing, tobermorite and xonotlite are formed from the lime and silica. While tobermorite can be formed at lower curing pressures, for example 10 bar, the formation of xonotlite requires higher pressures.

The transformation of lime and silica to tobermorite and xonotlite is also affected by the amount of time that the product is cured. The longer the curing time (at pressures sufficient to form xonotlite), the more xonotlite is formed. According to embodiments of the invention, the curing is continued only until the desired proportions of xonotlite and tobermorite are achieved in the calcium silicate hydrate matrix, for example 51-90 weight percent xonotlite and 10-49 weight percent tobermorite. The curing is not continued beyond this time, in order to avoid the creating of a calcium silicate hydrate matrix that is substantially all xonotlite. As is shown below, such a product would not have the desired performance properties. In embodiments, the curing time may be, for example, 5-8 hours, depending on the steam pressure. The product is preferably held under light pressure between wire racks during the curing cycle.

It is believed that the surprising strength and durability of insulation products according to embodiments of the invention result primarily from the particular proportions of xonotlite, tobermorite, and wollastonite, in addition to the effect of the reinforcing carbon fibers.

It will be recognized that the conversion of lime and silica to other forms may not be complete at the time the desired proportions of xonotlite and tobermorite are achieved. Accordingly, the resulting insulation product may include some residual fines of lime and silica.

The cured insulation product may be further dried and heat treated, for example in an oven at temperatures between 200° F. and 700° F., over a period of days. The product may then be sanded to final shape.

EXAMPLES

Table 1 below gives the mineral content of several example material compositions A-F of insulation products, and Table 2 gives various performance parameters of the example compositions A-F. Each of the examples also includes about 1.75-2.0 weight % carbon fibers, not included in the mineral compositions in Table 1.

TABLE 1

|   | Density lb/ft³ | Xonotlite wt. % | Tobermorite wt. % | Wollastonite wt. % | Fines wt. % | Xonotlite % in calsil matrix | Xonotlite/ Tobermorite Ratio |
|---|---|---|---|---|---|---|---|
| A | 51.7 | 38 | 24 | 34 | 4 | 61 | 1.56 |
| B | 51.4 | 20 | 22 | 44 | 14 | 48 | 0.92 |
| C | 52.4 | 27 | 11 | 54 | 8 | 71 | 2.44 |
| D | 61.1 | 45 | 11 | 39 | 4 | 80 | 4.00 |
| E | 52.2 | 35 | 25 | 38 | 2 | 58 | 1.38 |
| F | 52.7 | 63 | 3 | 34 | 1 | 95 | 19.00 |

TABLE 2

|   | Flexural Strength lb/in² | Compressive Strength lb/in² | Hardness Rockwell D | Shrinkage at 1380° F. % length/thickness |
|---|---|---|---|---|
| A | 1061 | 2366 | 68/70 | 0.3/0.98 |
| B | 950 | 1410 | 68/70 | 0.5/0.95 |
| C | 1549 | 3262 | 72/73 | 0.36/0.77 |
| D | 1590 | 3641 | 75/80 | 0.3/1.05 |
| E | 1062 | 2345 |  |  |
| F | 1340 | 2649 | 76/66 | 0.3/1.40 |

For the purposes of this disclosure, flexural strength is as measured according to ASTM test standard C203, and compressive strength is as measured according to ASTM test standard C165. Shrinkage is as measured according to ASTM test standard C356. For the purposes of this disclosure, shrinkage in "thickness" means in the smallest dimension of the tested shape, for example the thickness of a slab or board shape, and shrinkage in "length" means in dimensions other than the smallest dimension, for example the length or width of a slab or board shape.

Examples B and F are comparative examples. Example B has less than 50% xonotlite in the calcium silicate hydrate matrix and more than 50% tobermorite. As can be seen, Example B is relatively weak and has a relatively large shrinkage as compared with some embodiments of the invention. Example F has a very large proportion of xonotlite in the calcium silicate hydrate matrix, and also does not achieve maximum strength, and has a high shrinkage rate.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An insulating material, comprising:
   a calcium silicate hydrate matrix having 51-90 weight percent xonotlite and 10-49 weight percent tobermorite; and
   wollastonite;
   wherein the weight of wollastonite in the insulating material is 25-200 percent of the combined weights of the xonotlite and tobermorite;
   and wherein the insulating material is formed into a substantially uniform rigid body.

2. The insulating material of claim 1, wherein the calcium silicate hydrate matrix has 62-81 weight percent xonotlite and 19-38 weight percent tobermorite.

3. The insulating material of claim 1, wherein the calcium silicate hydrate matrix has 66-76 weight percent xonotlite and 24-34 weight percent tobermorite.

4. The insulating material of claim 1, further comprising carbon reinforcing fibers, wherein the insulating material has a flexural strength of at least 1300 lb/in².

5. The insulating material of claim 4, wherein the insulating material has a flexural strength of at least 1400 lb/in².

6. The insulating material of claim 4, wherein the insulating material has a flexural strength of at least 1500 lb/in².

7. The insulating material of claim 1, wherein the insulating material has a compressive strength of at least 2600 lb/in².

8. The insulating material of claim 1, wherein the insulating material has a compressive strength of at least 3200 lb/in$^2$.

9. The insulating material of claim 1, wherein the density of the insulating material is less than 55 lb/ft$^3$.

10. The insulating material of claim 1, wherein the insulating material has a linear shrinkage in length of less than 0.5 percent at 1380° F.

11. The insulating material of claim 1, wherein the insulating material has a linear shrinkage in length of less than 0.4 percent at 1380° F.

12. The insulating material of claim 11, wherein the insulating material has a linear shrinkage in thickness of less than 0.90 percent at 1380° F.

13. The insulating material of claim 1, further comprising carbon fibers and fines of lime and silica, wherein the insulating material has:
    a flexural strength of at least 1300 lb/in$^2$;
    a compressive strength of at least 2600 lb/in$^2$; and
    a density of less than 55 lb/ft$^3$.

14. The insulating material of claim 1, further comprising carbon fibers and fines of lime and silica, wherein the insulating material has:
    a flexural strength of at least 1500 lb/in$^2$;
    a compressive strength of at least 3200 lb/in$^2$; and
    a density of less than 55 lb/ft$^3$.

15. The insulating material of claim 1, wherein the weight of wollastonite in the insulating material is 50-175 percent of the combined weights of the xonotlite and tobermorite.

16. The insulating material of claim 1, wherein the weight of wollastonite in the insulating material is 120-160 percent of the combined weights of the xonotlite and tobermorite.

17. A method of making an insulating material, the method comprising:
    providing as dry solids
        10-20 weight percent previously-prepared xonotlite,
        15-25 weight percent lime,
        15-25 weight percent silica, and
        35-55 weight percent wollastonite;
    blending the dry solids with water to form a slurry;
    filter pressing the slurry to form a pressed shape; and
    curing the resulting pressed shape under steam pressure only until the resulting composition includes, in addition to the wollastonite and any residual lime and silica, a calcium silicate hydrate matrix having 51-90 weight percent xonotlite and 10-49 weight percent tobermorite.

18. The method of claim 17, comprising curing the resulting pressed shape under steam pressure only until the resulting composition includes, in addition to the wollastonite and any residual lime and silica, a calcium silicate hydrate matrix having 62-81 weight percent xonotlite and 19-38 weight percent tobermorite.

19. The method of claim 17, comprising curing the resulting pressed shape under steam pressure only until the resulting composition includes, in addition to the wollastonite and any residual lime and silica, a calcium silicate hydrate matrix having 66-76 weight percent xonotlite and 24-34 weight percent tobermorite.

20. The method of claim 17, wherein curing the resulting pressed shape under steam pressure comprises curing the resulting pressed shape under saturated steam at 12-18 bar for 5 to 8 hours.

* * * * *